US012513496B2

(12) United States Patent
Törnkvist et al.

(10) Patent No.: US 12,513,496 B2
(45) Date of Patent: Dec. 30, 2025

(54) METHOD AND APPARATUS FOR MANAGING CHARGING OPERATIONS FOR A COMMUNICATION NETWORK

(71) Applicant: Telefonaktiebolaget LM Ericsson (publ), Stockholm (SE)

(72) Inventors: Robert Törnkvist, Karlskrona (SE); Karthikeyan Chandrasekar, Chennai (IN); Sandeep Khemka, Gurugram (IN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 473 days.

(21) Appl. No.: 18/010,830

(22) PCT Filed: Jul. 2, 2020

(86) PCT No.: PCT/SE2020/050697
§ 371 (c)(1),
(2) Date: Dec. 16, 2022

(87) PCT Pub. No.: WO2022/005351
PCT Pub. Date: Jan. 6, 2022

(65) Prior Publication Data
US 2023/0232193 A1      Jul. 20, 2023

(51) Int. Cl.
*H04W 4/24* (2024.01)
(52) U.S. Cl.
CPC ..................... *H04W 4/24* (2013.01)
(58) Field of Classification Search
CPC ....... H04W 4/24; H04M 15/62; H04M 15/66; H04M 15/81; H04M 15/82; H04M 15/785;
(Continued)

(56) References Cited

U.S. PATENT DOCUMENTS

2014/0348030 A1*   11/2014   Tornkvist .............. H04M 15/60
                                                                 370/259

FOREIGN PATENT DOCUMENTS

| EP | 2874347 A1 | 5/2015 |
| EP | 3672151 A1 | 6/2020 |
| WO | 2019182572 A1 | 9/2019 |

OTHER PUBLICATIONS

3GPP, "3GPP TS 32.240 V15.5.0", 3rd Generation Partnership Project; Technical Specification Group Services and System Aspects; Telecommunication management; Charging management; Charging architecture and principles (Release 15), Dec. 2019, 1-60.
(Continued)

*Primary Examiner* — Huy C Ho
(74) *Attorney, Agent, or Firm* — Murphy, Bilak & Homiller, PLLC (57) ABSTRACT

A node of a charging system associated with a communication network grants a charging request, with the response including a granted quota of units for authorizing consumption of the involved communication service by a user device, along with an indication of whether the granted quota applies on an immediate basis or on a deferred basis. For example, the response indicates whether quota management is active for the involved communication service, with the granted quota applying immediately to consumption of the service if quota management is active and applying on a deferred basis if quota management is inactive. Providing a granted quota while quota management is inactive offers several advantages, such as proactively providing individual charging sessions with granted units of service consumption that may be used subsequently, upon quota management becoming active, thereby avoiding the "flood" of charging session requests that would otherwise be generated upon quota management becoming active.

22 Claims, 9 Drawing Sheets

(58) Field of Classification Search
CPC .. H04M 15/853; H04M 15/854; H04M 15/88; H04M 15/8228; H04L 12/14
USPC .......................................................... 455/406
See application file for complete search history.

(56) References Cited

OTHER PUBLICATIONS

3GPP, "3GPP TS 32.240 V16.1.0", 3rd Generation Partnership Project; Technical Specification Group Services and System Aspects; Telecommunication management; Charging management; Charging architecture and principles (Release 16), Dec. 2019, 1-61.

3GPP, "3GPP TS 32.290 V16.3.0", 3rd Generation Partnership Project; Technical Specification Group Services and System Aspects; Telecommunication management; Charging management; 5G system; Services, operations and procedures of charging using Service Based Interface (SBI) (Release 16), Dec. 2019, 1-34.

3GPP, "3GPP TS 32.291 V16.3.0", 3rd Generation Partnership Project; Technical Specification Group Services and System Aspects; Telecommunication management; Charging management; 5G system, charging service; Stage 3 (Release 16), Mar. 2020, 1-117.

Amdocs, "Add CHF-Controlled Quota Management functionality", 3GPP TSG-SA5 Meeting #130e, S5-202277, e-meeting, Apr. 20-28, 2020, 1-2.

Amdocs, "DP on alternative solutions for CHF-Controlled Quota Management", 3GPP TSG SA5 Meeting #131e, S5-203463, e-meeting, May 25-Jun. 3, 2020, 1-8.

Bertz, L., et al., "Diameter Credit-Control Application", Internet Engineering Task Force (IETF), Request for Comments: 8506, Obsoletes: 4006, Category: Standards Track, Mar. 2019, 1-130.

Ericsson, "Add unlimited quota in threshold triggers", 3GPP TSG-SA5 Meeting #129-e, S5-201252, Online, Feb. 24, 2020-Mar. 4, 2020, 1-2.

Huawei, "Add the parameters for CHFQM", 3GPP TSG-SA5 Meeting #131e, S5-203104, e-meeting, May 25-Jun. 3, 2020, 1-23.

Huawei, "Addition of Suspend or resume quota management", 3GPP TSG-SA5 Meeting #130e, S5-202180, e-meeting, Apr. 20-24, 2020, 1-9.

Matrixx, "Settings on Quota Management Indication for CHFCQM", 3GPP TSG-SA5 Meeting #131e, S5-203137, e-meeting, May 25-Jun. 3, 2020, 1-9.

Nokia, et al., "Introduction of ATSSS triggers", 3GPP TSG-SA5 Meeting #130e, S5-202007, e-meeting, Apr. 20-28, 2020, 1-13.

"ETSI TS 132 290 V16.5.0", 5G; Telecommunication management; Charging management; 5G system; Services, operations and procedures of charging using Service Based Interface (SBI) (3GPP TS 32.290 version 16.5.0 Release 16), Nov. 2020, 1-41.

* cited by examiner

METHOD AND APPARATUS FOR MANAGING CHARGING OPERATIONS FOR A COMMUNICATION NETWORK

TECHNICAL FIELD

The present invention relates to managing online charging operations for communication network, with respect to changing between active and inactive quota management.

BACKGROUND

"Online" charging for a communication service provided via a communication network refers to procedures involving real-time decisions about whether to authorize initial or continued consumption of the service based on the availability of credit in an account linked to a user device. In an example of online charging, a network entity sends a request to a charging system, requesting a grant of units for authorizing consumption of a communication service by a user device. The charging system grants a quota of units corresponding to a certain amount of service usage and makes a corresponding credit reservation against a credit account associated with the user device. The granted units may be referred to as "service units", as they represent units of consumption of the involved communication service.

The size of the credit reservation depends on the number of units granted—the quota size—and a "rating function" that determines the value of the granted quota expressed in whatever terms are applicable to the credit account. Because the granted quota provides authorization for only a certain amount of service consumption, e.g., a certain number of voice minutes or a certain amount of data transfer, the charging session corresponding to an ongoing communication session may include an initial request for a grant of service units, followed by one or more intermediate requests, to cover corresponding increments of continued use of the communication service by the user device, which may also be referred to as a "User Equipment" or UE.

Under the foregoing framework of active quota management, initial and continued consumption of a communication service depends on repeated charging requests and quota grants, with each grant requiring a corresponding credit reservation against a targeted repository of credit. An additional point of flexibility arises from the use of "suspended" quota management, where quota management is temporarily inactive and consumption is effectively unlimited. As an example, a network operator may inactivate quota management for one or more communication services or types of services during certain hours, or in certain locations, or for certain types of connections. Consumption may still be tracked and recorded while quota management is inactive, but granted quotas are not needed for consumption of the involved communication service(s). The Fifth Generation (5G) network specifications promulgated by the Third Generation Partnership Project (3GPP) provide for dynamic switching from active quota management to inactive quota management and vice versa.

Figure 1:
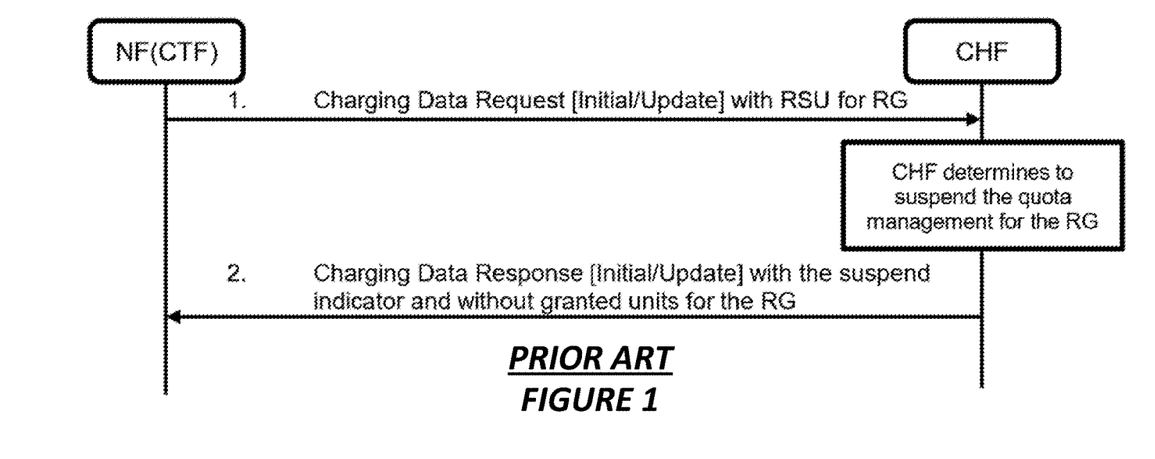
FIG. 1 is a prior art message sequence diagram of one embodiment for suspending quota management.

FIG. 1 illustrates a conventional message sequence between a network function (NF), such as charging trigger function (CTF), and a charging function (CHF) of a charging system. Suspending quota management (i.e., transitioning from active quota management to inactive quota management) can occur after the CHF receives an initial or intermediate (update) Charging Data Request from the CTF. An initial Charging Data Request corresponds to establishing a charging session in conjunction with establishing a communication session involving a communication service subject to online charging, whereas an update Charging Data Request corresponds to the continuation of an established charging session for an ongoing communication session.

The Charging Data Request includes a Requested Service Unit (RSU) value, indicating a requested number of service units, along with an indicated Rating Group (RG) for rating the units. With active quota management, the CHF would determine a quota allocation to grant, and return a quota of Granted Service Units (GSUs) in a Charging Data Response. However, in this example, the CHF decides to inactivate quota management and therefore returns a Charging Data Response that indicates the suspension of quota management and, in view of quota management being inactive, omits any GSUs.

Figure 2:
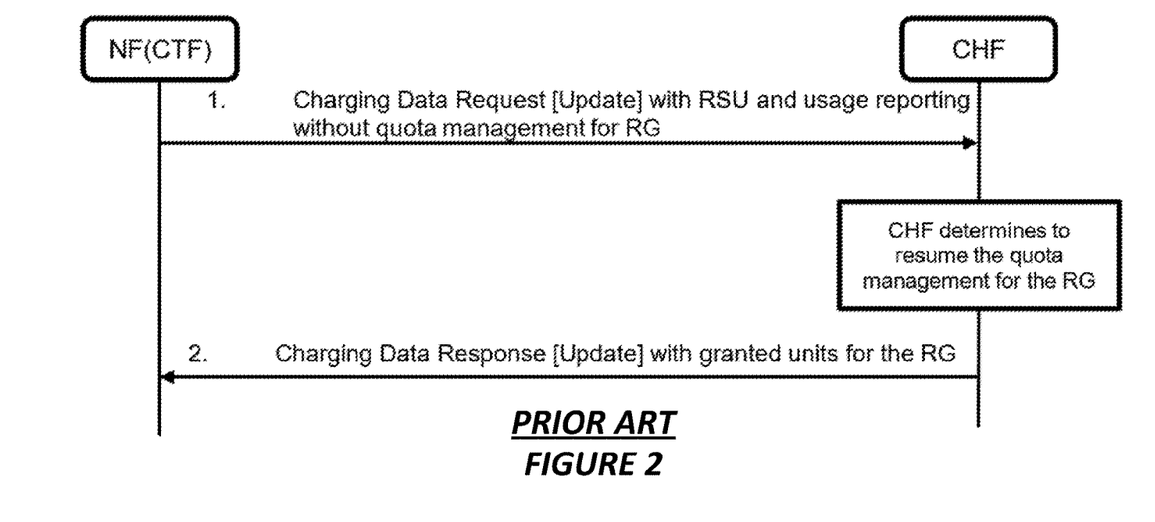
FIG. 2 is a prior art message sequence diagram of one embodiment for suspending quota management.

FIG. 2 illustrates a conventional message sequence between a NF and a CHF for a case that involves the CHF receiving an update Charging Data Request that includes an RSU value and usage reporting corresponding to the ongoing communication service consumption. In this example, quota management is inactive when the CHF receives the request but it decides to resume quota management—i.e., activate quota management. Because of reactivation of quota management, the CHF responds to the request with a Charging Data Response that includes a granted quota—i.e., it indicates GSUs that authorize or "cover" a defined amount of consumption of the ongoing communication service.

The operations in FIG. 1 and FIG. 2 may be "stateful" or "stateless". In the stateless variation, each Charging Data Request indicates RSUs and each Charging Data Response indicates whether quota management is active or inactive. In stateful approaches, the CTF and CHF "remember" the current state—quota management active or inactive—and do not necessarily include corresponding indicators in every exchanged message.

Figure 3:
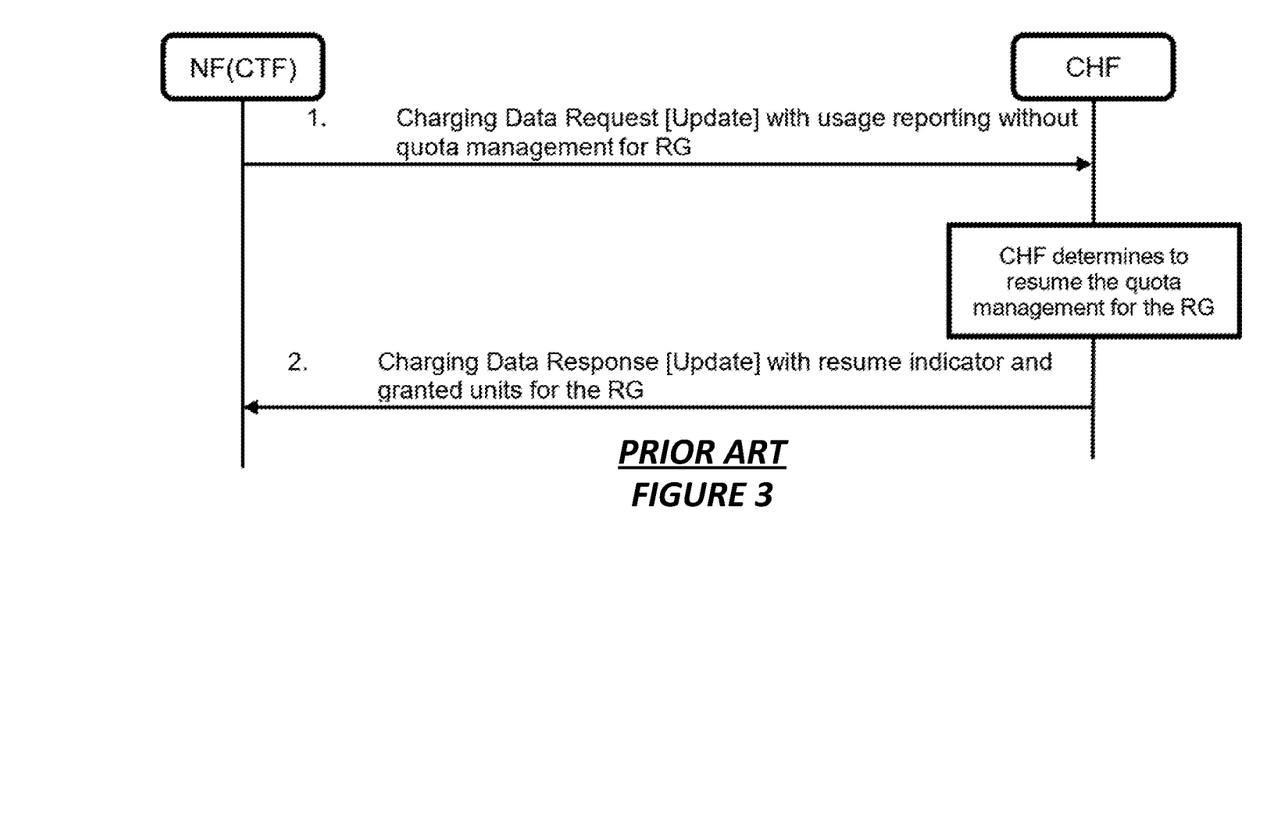
FIG. 3 is a prior art message sequence diagram of one embodiment for suspending quota management.

FIG. 3 illustrates a conventional message sequence between a NF and a CHF for the stateful method of resuming quota management. In FIG. 3, the CHF receives a Charging Data Request Update message from the NF that includes usage reporting but, because the CTF knows that quota management is inactive, does not indicate RSUs. The CHF decides to resume quota management and, correspondingly, sends a Charging Data Response message that indicates the resumption of active quota management and indicates the GSUs—i.e., the granted quota. In addition to switching between active and inactive quota management for given communication services, the charging system may also impose or operate with changing tariffs. Here, "tariff" refers to the "cost" of a communication service, in terms of rating units of consumption, which obligates the network and the charging system to distinguish between consumption that occurs before the tariff change versus consumption that occurs after the tariff change. See the 3GPP Technical Specification (TS) 32.240 V15.5.0 (2019-12) for example charging architecture and principles in a 3GPP network context, including details related to handling tariff changes.

SUMMARY

A node of a charging system associated with a communication network grants a charging request, with the response including a granted quota of units for authorizing consumption of the involved communication service by a user device, along with an indication of whether the granted quota applies on an immediate basis or on a deferred basis. For example, the response indicates whether quota management is active for the involved communication service, with the granted quota applying immediately to consumption of the service if quota management is active and applying on a deferred basis if quota management is inactive. Providing a granted quota while quota management is inactive offers several advantages, such as proactively providing individual charging sessions with granted units of service consumption that may be used subsequently, upon quota management becoming active, thereby avoiding the "flood" of charging session requests that would otherwise be generated upon quota management becoming active.

In one example embodiment, a method of operation is performed by a network node of a charging system associated with a communication network. The method includes receiving a request in relation to a charging session for a user device, for authorizing consumption by the user device of a communication service provided via the communication network. The method further includes the network node granting a quota of units authorizing a corresponding amount of consumption of the communication service by the user device, the granted quota granted in dependence on a credit reservation. Further, the method includes the network node sending a response to the request that indicates the granted quota and indicates whether quota management is active, where the granted quota applies to the charging session on an immediate basis if quota management is active and otherwise applies on a deferred basis, upon quota management subsequently becoming active.

In another example embodiment, a network node is configured for operation in a charging system associated with a communication network and includes communication interface circuitry and processing circuitry that is operatively associated with the communication circuitry. The processing circuitry is configured to receive, via the communication interface circuitry, a request in relation to a charging session for a user device, for authorizing consumption by the user device of a communication service provided via the communication network. The processing circuitry is further configured to grant a quota of units authorizing a corresponding amount of consumption of the communication service by the user device, the granted quota granted in dependence on a credit reservation. Still further, the processing circuitry is configured to send, via the communication interface circuitry, a response to the request that indicates the granted quota and indicates whether quota management is active, where the granted quota applies to the charging session on an immediate basis if quota management is active and otherwise applies on a deferred basis, upon quota management subsequently becoming active.

In yet another example embodiment, a network node is configured for operation in a charging system for a communication network and includes a number of processing units or modules, such as may be implemented using virtualization of computational and memory resources on a host computer of a data center. The processing units include a receiving unit that is configured to receive a request in relation to a charging session for a user device, for authorizing consumption by the user device of a communication service provided via the communication network. A granting unit is configured to grant a quota of units authorizing a corresponding amount of consumption of the communication service by the user device, the granted quota granted in dependence on a credit reservation. A sending unit is configured to send a response to the request that indicates the granted quota and indicates whether quota management is active, where the granted quota applies to the charging session on an immediate basis if quota management is active and otherwise applies on a deferred basis, upon quota management subsequently becoming active.

Of course, the present invention is not limited to the above features and advantages. Indeed, those skilled in the art will recognize additional features and advantages upon reading the following detailed description, and upon viewing the accompanying drawings.

DETAILED DESCRIPTION

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed unless a step is explicitly described as following or preceding another step and/or where a step must necessarily follow or precede another step due to some dependency. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Current handling of the triggers for quota management resume and suspend operations, as well as tariff switching operations, are described in 3GPP TS 32.240, 3GPP TS 32.290 and IETF RFC 8506, for example. Additionally, the TS 32.290, S5-201252, S5-202180 and S5-202277 describe the existing handling of suspension and resumption of quota management.

It is appreciated that these existing solutions may work well (i.e., not overly burden the compute, storage, and network resources of the charging system) when viewed in isolation for a single user device or user data session. However, when viewed in the aggregate over many user devices or user data sessions simultaneously switching from being quota managed to not being quota managed at a specific point in time, current solutions use either a "charging Notify-Reauthorization" at the specific point in time or a "tariff switch mechanism". With use of a "charging Notify-Reauthorization" at a specific point in time, there is a risk of message "flooding", which may overload the network. In the tariff switch mechanism, which only allows reporting of used units, a first complication with existing solutions is that the granted quota will either be considered unlimited or limited both before and after the tariff switch. As mentioned above, the use of "suspended" quota management is where quota management is temporarily inactive and consumption is effectively unlimited. However, quota management can also be active and associated with an unlimited quota.

Another complication with the existing tariff switch mechanism is that the charging trigger applicable to the quota managed case and the charging trigger applicable to the quota suspended case may be different. For example, when the quota management is suspended most triggers will be deferred. In the quota managed case, however, triggers may need to be immediate. Various embodiments will now be described in greater detail below with respect to the figures, to illustrate managing online charging operations of communication services accounting for quota management and tariff switching operations that overcome the disadvantages of existing solutions.

Figure 4:
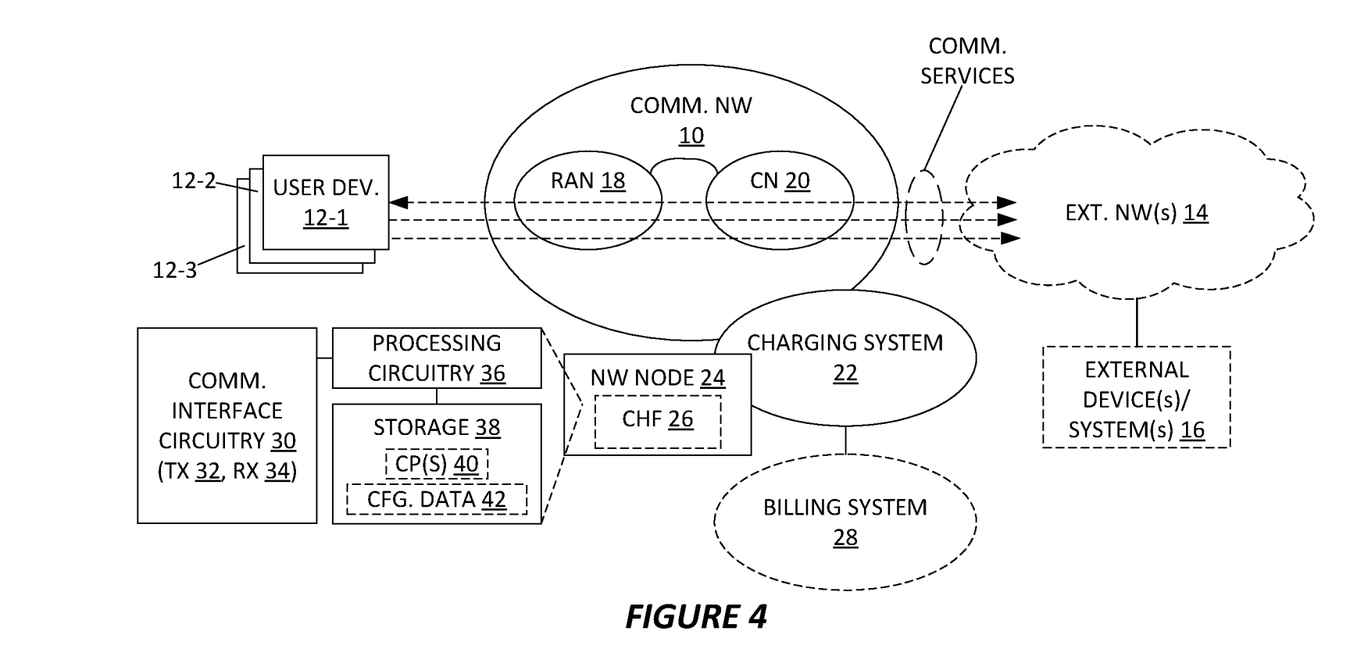
FIG. 4 is a block diagram of one embodiment of a network node of an online charging system that is included in or associated with a communication network.

FIG. 4 is a block diagram of one embodiment of a network node of an online charging system that is included in or associated with a communication network. FIG. 4 illustrates a communication network 10, shown in communicative coupling with one or more external networks 14 that are associated with one or more communication services, e.g., voice calls, music and video services, web browsing, social media services, etc. In this respect, the communication network 10 operates as an access network, providing respective user devices 12 with access to one or more types of communication services, with at least some of those communication services being subject to online charging. In that regard, FIG. 4 depicts a charging system 22 that is configured to support online charging for use of the communication network 10 by user devices 12 in accessing one or more communication services or types of services.

While the user devices 12-1, 12-2, and 12-3 appear in the diagram for example purposes, no limitation attends the example count. The communication network 10 may support any number of user devices 12 at any given time, where suffixing is not used for the reference number "12" unless needed for clarity. This disclosure uses the term "User Equipment" or "UE" interchangeably with "user device" and, for convenience will hereafter refer to a "UE 12" or "UEs 12".

The communication network 10 allows the UEs 12 access to one or more communication services, such as may be available from external devices or systems 16 that are accessible via the Internet or another external network 14. In the example case, the communication network 10 is a wireless communication network that includes a Radio Access Network (RAN) 18 that provides an air interface for communicatively coupling to the UEs 12. In this regard, the UEs 12$i$ include radio transceiver circuitry configured for communicating with the RAN 18, according to the applicable radio signal types, structure, timing, and protocols. As a non-limiting example, the communication network 10 operates according to the Fifth Generation (5G) specifications and the RAN 18 provides a New Radio (NR) interface.

The communication network 10 further includes a core network (CN) 20 that supports mobility management of the UEs 12 within the coverage area(s) of the RAN 18 and provides for UE authentication and data routing to/from respective ones of the UEs 12 and the external network(s) 14. Although individual nodes are not shown for the CN 20, the CN 20 may include multiple nodes of varying types and functionality.

The charging system 22 includes one or more charging system network nodes, with an example charging system network node 24 depicted. In the example of FIG. 4, the charging system network node 24, is also referred to as "the network node 24". The network node 24 comprises or implements a Charging Function (CHF) 26 and communicatively couples to billing system 28.

The network node 24 maintains or has access to charging-related information, such as access to subscriber accounts that are involved in online charging of communication services provided via the network to specific UEs 12. In this context, a "subscriber" is a person or other entity associated with stored credit that is used to "pay" for the use of one or more communication services provided by or through the communication network 10. For example, a subscriber may have an account directly with the operator of the communication network 10, to pay for communication services consumed by one or more UEs 12 that are owned by the subscriber or are otherwise linked to the account and authorized for such usage. Alternatively, the subscriber may have an account with another network operator who in turn has an agreement with the operator of the network 10.

In the area of online credit control in the domain of BSS (Business Support Systems) depicted in FIG. 4, different network elements carry out different, and sometimes dedicated, functionality in the BSS domain. These network elements can be deployed through various means, including but not limited to bare metal, virtualized, or containerized implementations. Regardless of the deployment, resource optimization (e.g., compute, storage, and network resources) is an important consideration to service providers.

The network node 24 may be a single node, e.g., a single server, or part of a server, or may be distributed, e.g., implemented across two or more servers. Further, the network node 24 may be implemented in a data center or other cloud-computing environment, e.g., where the network node 24 is a virtual machine, or a part thereof, based on the instantiation of virtualized processing and memory resources within a physical host computer.

Whether implemented as a single node or implemented in a distributed arrangement, an example network node 24 includes communication interface circuitry 30 for communicating with other nodes in or external to the charging system 22, e.g., one or more other nodes in the charging system 22 and/or in the communication network 10. In a non-limiting example, the communication interface circuitry 30 includes one or more transmitter circuits 32 and one or more receiver circuits 34 that implement wired or wireless physical interfaces, for receiving and sending charging-related signaling, such as receiving Charging Data Requests and returning Charging Data Responses. The communication interface circuitry 30 in at least one embodiment includes the physical-layer interface circuits, along with one or more protocol processors, timing circuits, etc., for implementing the involved communication protocols and signaling.

Further included in the network node 24 is processing circuitry 36, which may or may not use "virtualization" which involves the instantiation of virtualized processing resources using underlying processing hardware, as coordinated by the involved operating system and virtualization software. Even with virtualization, the processing circuitry 36 at least in an underlying sense comprises physical circuitry that is fixed circuitry or programmatically-configured circuitry or some combination of fixed circuitry and programmatically-configured circuitry.

In one or more embodiments, the processing circuitry 36 comprises one or more microprocessors, digital signal processors (DSPs), field programmable gate arrays (FGPAs), complex programmable logic devices (CPLDs), or application-specific integrated circuits (ASICs), or any combination thereof. Further, in at least one such embodiment, the processing circuitry 36 is configured, at least in part, based on its execution of stored computer-program instructions. For example, the storage 38 stores one or more computer programs (CP(s)) 40 comprising program instructions for execution by one or more microprocessors or other type of computer processor used to form the processing circuitry 36. The storage 38, which comprises one or more types of computer-readable media, such as memory circuits and/or disk storage, also may store various items of configuration data (CFG. DATA) 42. Example configuration data, which may be provisioned within or temporarily stored in the storage 38, includes information about charging-interval sizes for charging different types of communication services, rating data for determining the price or cost of service units, rules for granting quotas, etc.

Keeping in mind the above points of flexibility and variation, the network node 24 is configured for operation in a charging system 22 that is associated with a communication network 10. The network node 24 includes communication interface circuitry 30 comprising a wired or wireless communication interface for exchanging charging-related messages with one or more other nodes in the charging system 28 or the communication network 10. Further, the network node 24 includes processing circuitry 36 that is operatively associated with the communication interface circuitry 30. In at least one example case, referring to the processing circuitry 36 as being operatively associated with the communication interface circuitry 30 means that the processing circuitry 36 is arranged or otherwise configured to send and receive messages or other signaling, possibly of various types and involving more than one protocol, via the communication interface circuitry 30.

In an example embodiment, the processing circuitry 36 is configured to receive, via the communication interface circuitry 30 (e.g., receiver circuits 34), a request in relation to a charging session for a UE 12, for authorizing consumption by the UE 12 of a communication service provided via the communication network 10. The processing circuitry 36 is further configured to grant a quota of units authorizing a corresponding amount of consumption of the communication service by the user device, the granted quota granted in dependence on a credit reservation. Still further, the processing circuitry is configured to send, via the communication interface circuitry 30 (e.g., transmitter circuits 32), a response to the request that indicates the granted quota and indicates whether quota management is active, where the granted quota applies to the charging session on an immediate basis if quota management is active and otherwise applies on a deferred basis, upon quota management subsequently becoming active.

In the case that the granted quota applies on the deferred basis, the processing circuitry 36 in one or more embodiments is configured to further indicate in the response a trigger for quota management subsequently becoming active, for application of the granted quota to the charging session coincident with quota management subsequently becoming active. The trigger comprises an indicated time at which quota management will become active again, or an indicated condition under which quota management will become active again. In at least one example implementation, the processing circuitry 36 is configured to indicate in the response that quota management will become active coincident with a tariff change applicable to charging for use of the communication service. That is, in an example case or implementation, the transition from inactive quota management to active quota management, or vice versa, is tied to a tariff change. In such embodiments, the processing circuitry 36 is further configured to indicate in the response a time of the tariff change.

The processing circuitry 36 in one or more such embodiments is configured to further include in the response trigger information indicating one or more charging-report triggers applicable to consumption of the communication service in the charging session before the tariff change and one or more charging-report triggers applicable to consumption of the communication service in the charging session after the tariff change. More broadly, in at least one embodiment, in the case where quota management is inactive, the processing circuitry 36 is configured to include in the response to the charging request an indication of the time at which quota management will become active. The time indication represents one example of a "trigger" that may be indicated in the response, to indicate the timing or basis for a subsequent transition from the inactive mode to the active mode of quota management, or vice versa.

If quota management is inactive at the time the request is received, the processing circuitry 36 is configured to further include trigger information in the response that indicates one or more charging-report triggers applicable to consumption of the communication service in the charging session while quota management is suspended and one or more charging-report triggers applicable to consumption of the communication service in the charging session after quota management becomes active. In a case where the request comprises an initial charging request for establishing the charging session, the response comprises an initial charging response to establish the charging session. In a case where the request comprises an intermediate charging request subsequent to establishment of the communication session, the response comprises an intermediate charging response to continue the charging session.

To grant the quota of units authorizing the corresponding amount of consumption of the communication service by the UE 12 as the granted quota, the processing circuitry 36 is configured to initiate the credit reservation against available credit in a subscriber account associated with the UE 12. The value of the credit reservation depends on a rating function applied for the units in the granted quota.

Figure 5:
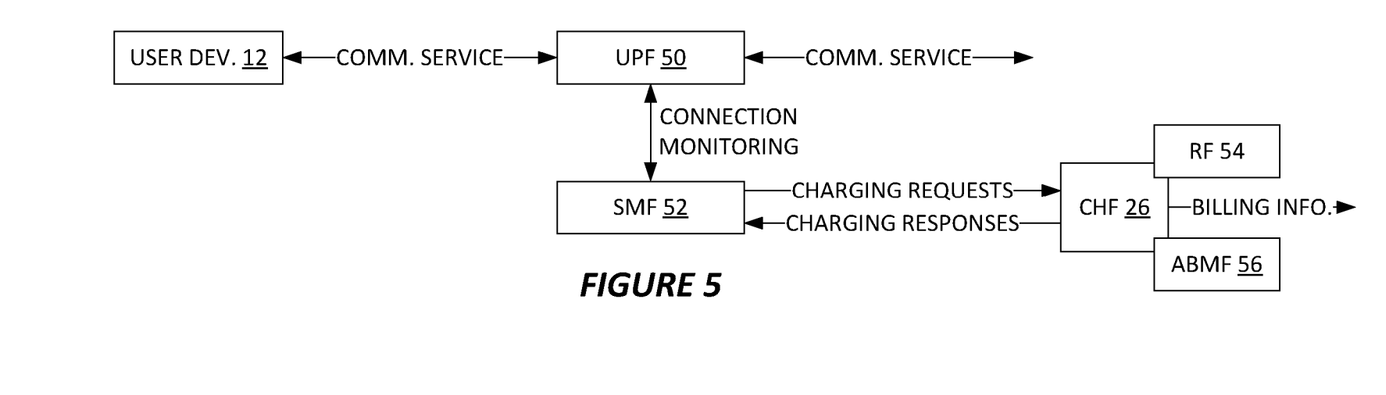
FIG. 5 is a block diagram illustrating example nodes or functions of a communication network and corresponding interactions with a network node of an online charging system.

FIG. 5 is a block diagram illustrating example interactions between a communication network 10 and a CHF 26, e.g., as implemented via the network node 24 of FIG. 4. The communication network 10 includes a User Plane Function (UPF) 50 that is involved in providing a communication service to a UE 12, with a Session Management Function (SFM) of the communication network 10 sending charging requests to the CHF 26 and receiving return charging responses, in support of establishing and continuing the communication session. The CHF 26 includes or has access to a Rating Function (RF) 54, for rating service units, for determining their "cost" in terms of the required credit reservations, and may include or have access to an Account Balance and Management Function (ABMF) 56, for making credit reservations against subscriber accounts and reconciling those reservations for the generation of charging data records.

Figure 6:
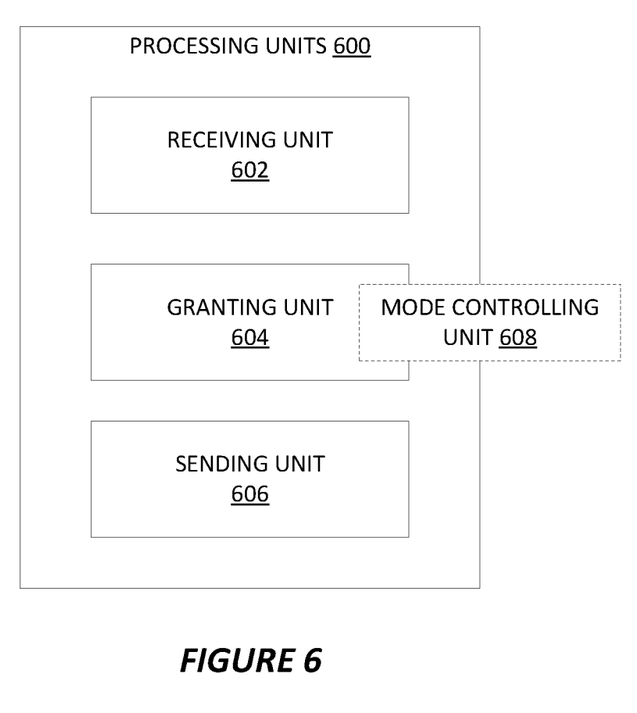
FIG. 6 is a block diagram of another embodiment of a network node of an online charging system.

FIG. 6 is a block diagram of another embodiment of a network node 24 of an online charging system 22 that is included in or associated with a communication network 10. The network node 24 comprises several processing modules or units 600. The depicted collection of processing units 600 may be realized, for example, via the processing circuitry 36 of the charging system node 22 shown in FIG. 4. In general, the processing units 600 may be virtual or non-virtual sets of configured processing resources, e.g., programmatically configured computing resources comprising physical processing circuitry or instantiated as virtualized processing circuitry on underlying physical processing circuitry.

Among the illustrated processing units 600, there is a receiving unit 602 that is configured to receive a request in relation to a charging session for a UE 12, for authorizing consumption by the UE 12 of a communication service provided via the communication network 10. Further included is a granting unit 604 that is configured to grant a quota of units authorizing a corresponding amount of consumption of the communication service by the UE 12, the granted quota granted in dependence on a credit reservation. The granting unit 604 may include or be associated with a mode controlling unit 608 that is configured to control or determine whether quota management is active or inactive in general, or at least with respect to the involved communication service. Further included is a sending unit 606 that is configured to send a response to the request received by the receiving unit 602.

The response indicates a granted quota to be used for authorizing consumption of the communication service by the involved UE 12, and further indicates whether quota management is active. If quota management is active, the granted quota applies on an immediate basis, i.e., it is a present grant for initiating or continuing the service consumption for which the request was sent. However, if quota management is inactive, the granted quota applies on a deferred basis, i.e., it is not needed for initiating or continuing the service consumption for which the request is sent, but will be needed later, upon quota management becoming active. In this sense, the granted quota may be understood as an advance allocation of service units that are available for making an initial authorization of service consumption in conjunction with quota management subsequently becoming active.

Consider a scenario where there is a multiplicity of ongoing charging sessions corresponding to a multiplicity of UEs 12 consuming a communication service that, for the time being, is not being quota managed. That is, quota management is inactive and the UEs 12 are therefore permitted to initiate and/or continue consumption of the service without requiring granted quotas and the corresponding credit reservations needed to grant such quotas. In a conventional charging system, each ongoing charging session would require a granted quota upon quota management becoming active. Correspondingly, the charging system 22 would be "flooded" with charging requests to obtain the needed quotas, upon activation of quota management for the ongoing charging sessions. Advantageously, by granting quotas in advance, the network node 24 of the charging system 22 avoids that initial flood of charging requests and, because of variations in consumption, etc., subsequent charging requests for the multiplicity of ongoing charging sessions should be distributed to some extent.

Figure 7:
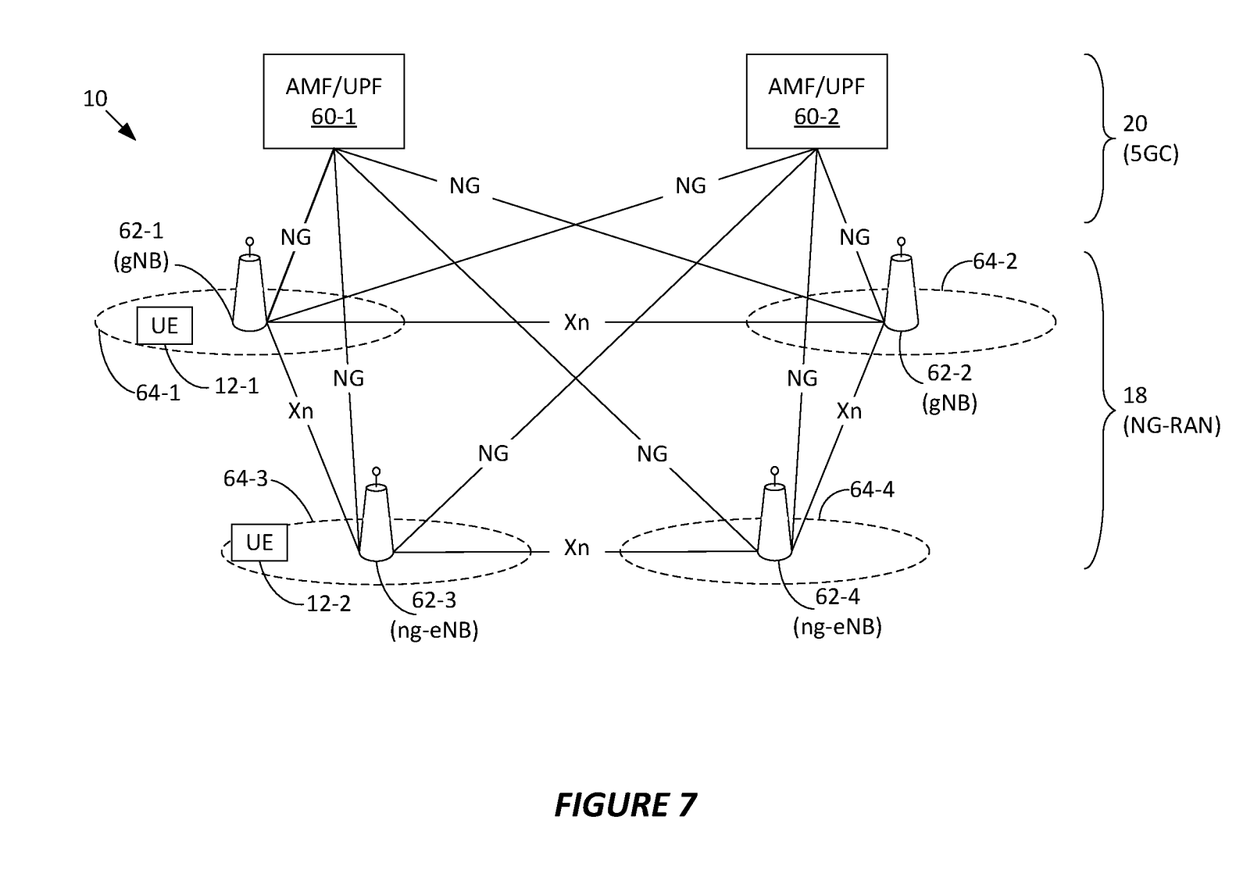
FIG. 7 is a block diagram of one embodiment of a communication network.

FIG. 7 is a block diagram illustrating an example implementation of the communication network 10 in a 5G configuration. However, the 5G context is non-limiting and the techniques disclosed herein have broad applicability to online charging in a variety of different networks.

In the depicted 5G context the RAN 18 is a Next Generation (NG) RAN, that includes a number of base stations 62, shown as a mix of "gNBs" that provide New Radio (NR) air interfaces and "ng-eNBs" that provide Fourth Generation (4G) Long Term Evolution (LTE) air interfaces.

The base stations 62-1 and 62-2 interconnect with each other via "Xn" interfaces and interconnect to one or more nodes in the CN 20 via "NG" interfaces. The diagram illustrates the CN 20 as including network nodes operative as Access and Mobility Functions (AMFs) and User Plane Functions (UPFs), as seen in the example nodes 60-1 and 60-2. However, the CN 20 may include more AMFs and/or UPFs and may include a variety of other nodes providing various types of Network Functions (NFs), such as the SMF discussed in the context of FIG. 6.

Each of the base stations 62 provides radio coverage over a corresponding area 64 that may be statically determined by the location of the base station 62 and its antenna configuration, or may be dynamically determined, e.g., using beam steering. The term "cell" may be used generically in reference to each coverage area 64, with the understanding that such cells may comprise beamformed coverage and may not be static.

Figure 8:
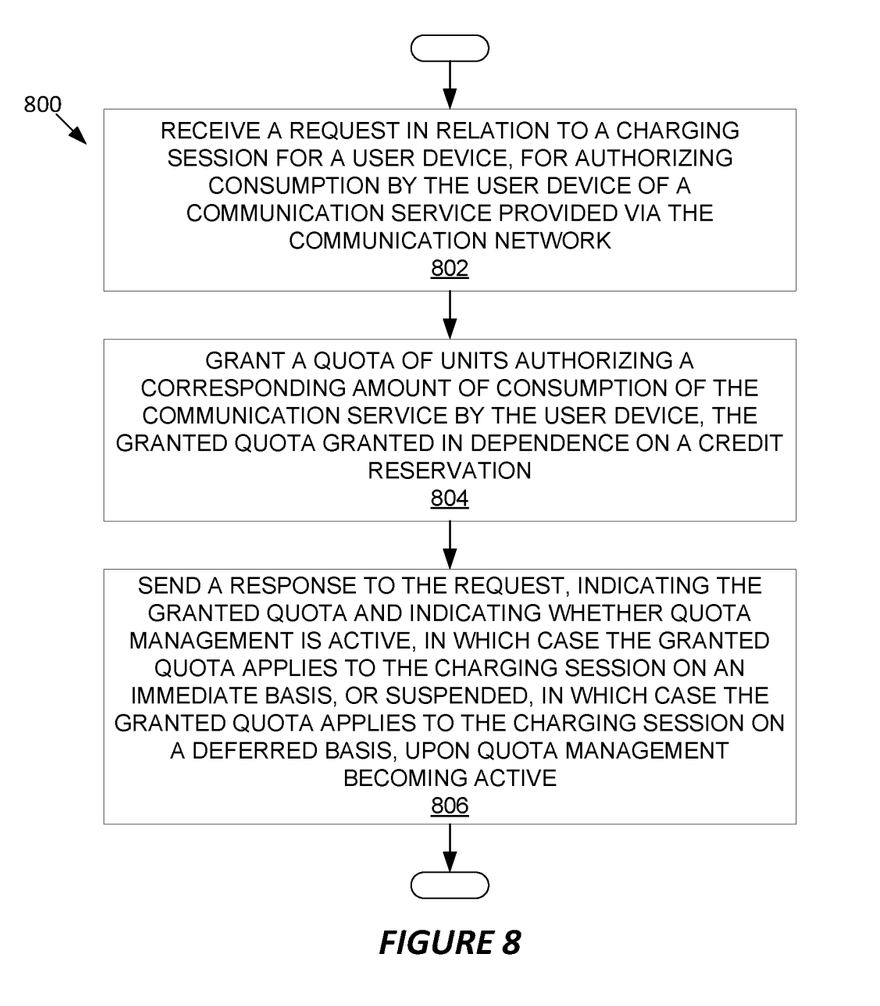
FIG. 8 is a logic flow diagram of one embodiment of a method performed by a network node of an online charging system.

The charging system 22 introduced in FIG. 4 interfaces with the example communication network 10 depicted in FIG. 7 and operates as described before, regarding quota granting and the advantageous operations detailed with respect to transitioning from active quota management to inactive quota management or vice versa. FIG. 8 highlights at least some of those advantageous operations in the form a method 800 that is performed by a charging-system node, e.g., the network node 24 introduced in FIG. 4.

The method 800 includes the charging-system node receiving (802) a request in relation to a charging session for a UE 12, for authorizing consumption by the UE 12 of a communication service provided via a communication network 10; granting (804) a quota of units authorizing a corresponding amount of consumption of the communication service by the UE 12, the granted quota granted in dependence on a credit reservation; and sending (806) a response to the request that indicates the granted quota and indicates whether quota management is active, where the granted quota applies to the charging session on an immediate basis if quota management is active and otherwise applies on a deferred basis, upon quota management subsequently becoming active.

In the case that the granted quota applies on the deferred basis, the method 800 may include further indicating in the response a trigger for quota management subsequently becoming active, for application of the granted quota to the charging session coincident with quota management subsequently becoming active. Indicating the trigger for quota management subsequently becoming active comprises, for example, indicating that quota management will become active coincident with a tariff change applicable to charging for use of the communication service. Correspondingly, the response may further indicate a time of the tariff change. In another embodiment, or in another example case, indicating the trigger for quota management subsequently becoming active comprises indicating a time at which quota management will become active.

In one or more embodiments, the response sent in reply to the charging request further includes trigger information indicating one or more charging-report triggers applicable to consumption of the communication service in the charging session before the tariff change and one or more charging-report triggers applicable to consumption of the communication service in the charging session after the tariff change.

If quota management is inactive, the method 800 may further include the charging-system node including trigger information in the response that indicates one or more charging-report triggers applicable to consumption of the communication service in the charging session while quota management is suspended and one or more charging-report triggers applicable to consumption of the communication service in the charging session after quota management becomes active.

Receiving the request comprises, for example, receiving an initial charging request for establishing the charging session, such that sending the response comprises sending an initial charging response to establish the charging session. As another example, receiving the request comprises receiving an intermediate charging request subsequent to establishment of the communication session, such that sending the response comprises sending an intermediate charging response to continue the charging session.

Granting the quota of units authorizing the corresponding amount of consumption of the communication service by the UE 12, as the granted quota, comprises, for example, initiating the credit reservation against available credit in a subscriber account associated with the user device. The value of the credit reservation depends on a rating function applied for the units in the granted quota.

Figure 9:
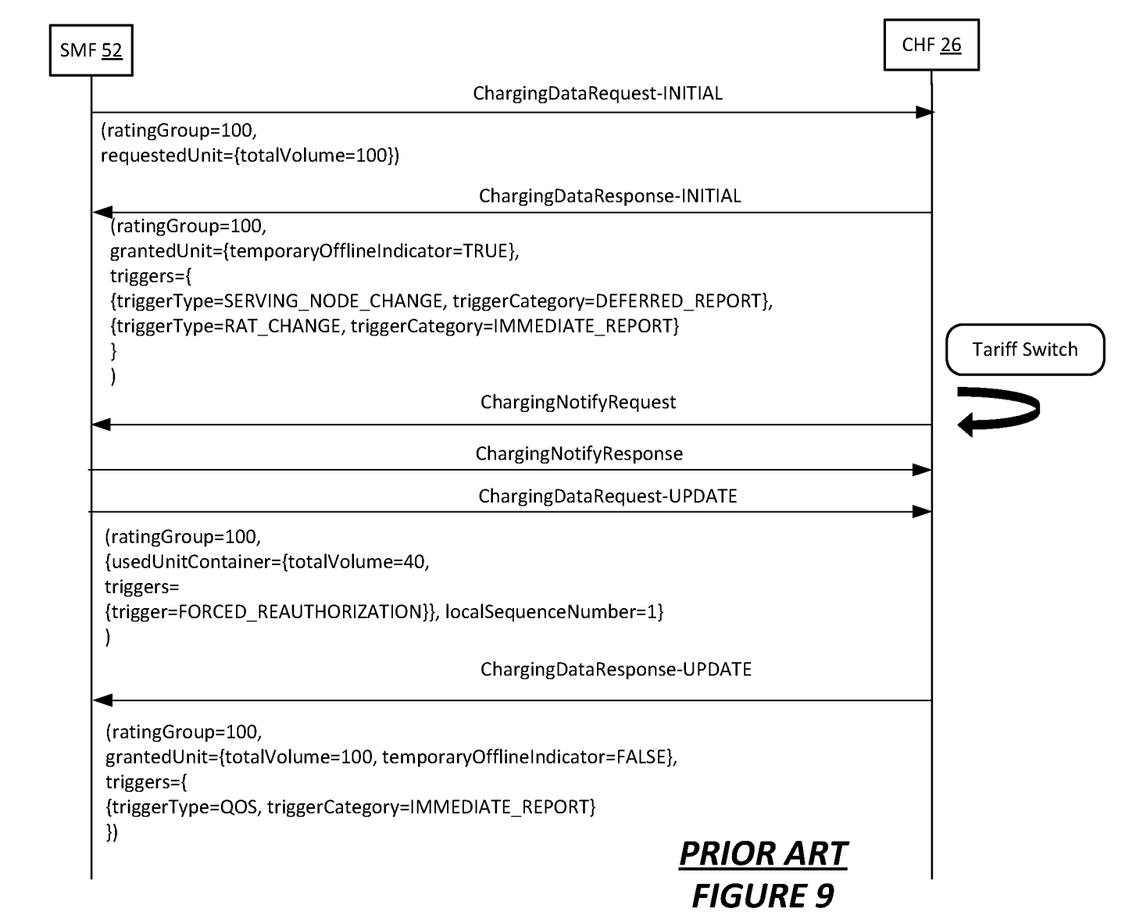
FIG. 9 is a prior art message sequence diagram of example implementation details performed by a network node of an online charging system.

FIG. 9 illustrates how a conventional CHF responds to an initial charging request from an SFM of a communication network, in a case where quota management is inactive, at least for the communication service at issue in the initial charging request. The SMF sends a ChargingDataRequest-INITIAL message to the CHF, where the request identifies a Rating Group and a requested volume of service units—in the diagram, the request includes that the total volume of requested units is 100.

Rather than responding to the request with a granted quota, the CHF omits any quota grant from its return ChargingDataResponse-INITIAL message, and instead indicates that quota management is inactive—denoted here as "temporaryOfflineIndicator=TRUE". Suspension of quota management—i.e., quota management inactive—may be viewed in some sense as being akin to offline charging because consumption is not governed by granted quotas.

In this example, the ChargingDataResponse-INITIAL includes various triggers for controlling when or under what circumstances consumption gets reported for consumption that occurs while quota management is inactive. Two triggers are shown. The first trigger includes a triggerType=SERVING_NODE_CHANGE and a triggerCategory=DEFERRED_REPORT. As used herein, the triggerCategory "DEFERRED_REPORT" indicates that immediate reporting is not required when the condition associated with the triggerCatgeory is satisfied (e.g., when there is a serving node change or a QoS change for a session). The second trigger includes the triggerType=RAT_CHANGE indicating a change of the radio access technology, and the second trigger is associated with immediate reporting.

However, a tariff switch for the involved communication service occurs subsequently, and the CHF sends a ChargingNotifyRequest to the SMF for the charging session, which results in the SMF sending a ChargingNotifyResponse message and a ChargingDataRequest-UPDATE message, indicating a "FORCED_REAUTHORIZATION" as a consequence of the ChargingNotifyRequest message, and indicating a current consumption amount for the involved service—shown in the example as "totalVolume=40". Assuming that the CHF changes to active quota management in conjunction with the tariff switch, continued consumption of the communication service by the involved UE 12 requires the CHF to grant a quota. Thus, the CHF responds to the ChargingDataRequest-UPDATE message with a ChargingDataResponse-UPDATE message that indicates that quota management is now active ("temporaryOfflineIndicator=FALSE"), and includes a granted quota ("grantedUnit"), along with any applicable triggers for consumption reporting.

The ChargingNotifyRequest/Response and the ChargingDataRequest/Response-UPDATE messages are triggered by the tariff switch for each affected charging session being supported by the CHF. Consequently, if there is a large plurality of charging sessions affected by the tariff switch, there will be a flood of messages exchanged between involved communication network and CHF, which burdens the network and forces the network operator to provision or otherwise configure the signaling and processing capacity of the affected nodes to handle these messaging "floods". Doing so has significant cost implications. Alternatively, not accounting for worst-case flooding leaves the involved nodes subject to outages or failures.

Figure 10:
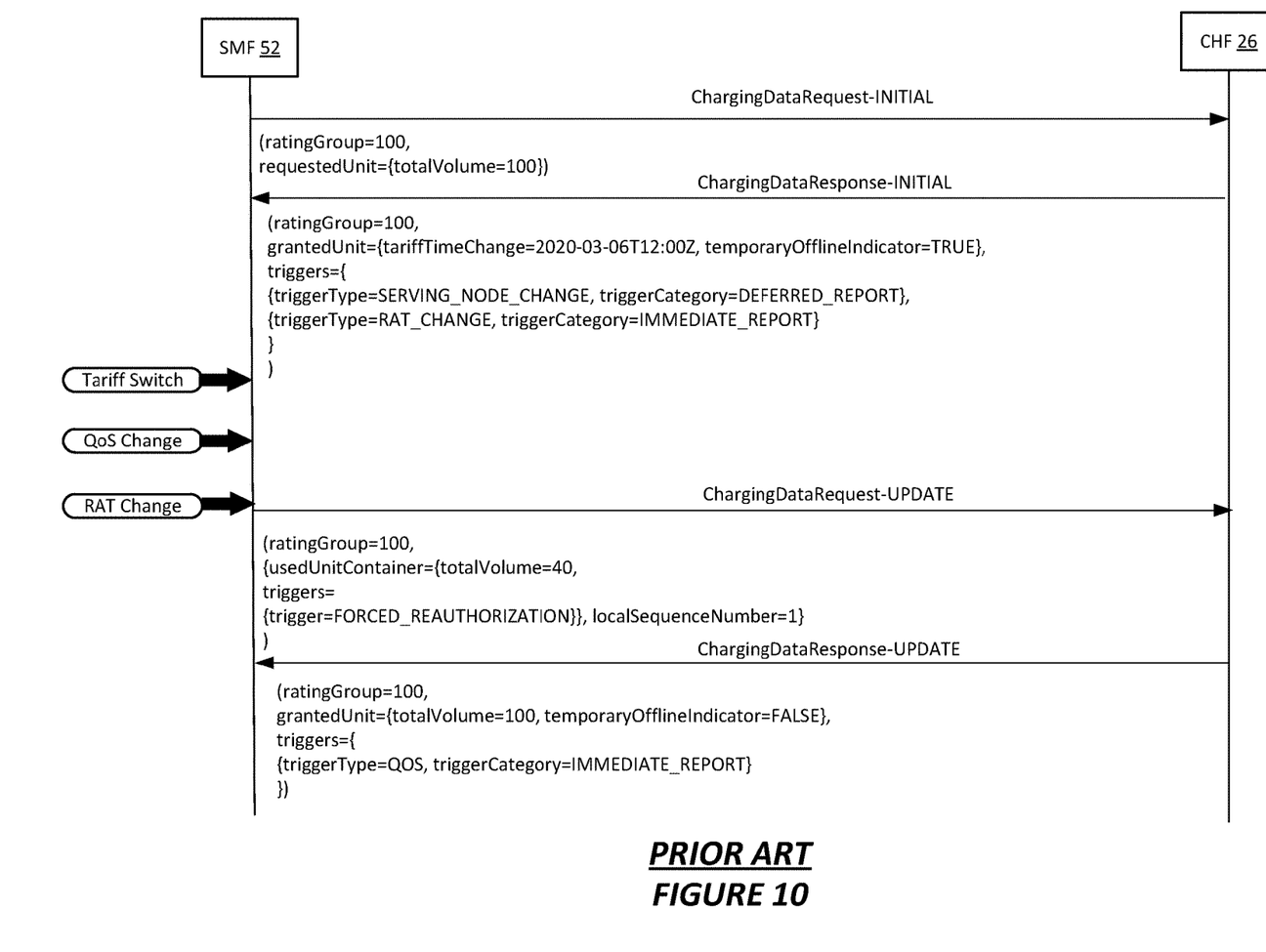
FIG. 10 is a prior art message sequence diagram of further example implementation details performed by a network node of an online charging system.

FIG. 10 illustrates another shortcoming of conventional charging-system implementations in the context of switching between inactive and active quota management. Namely, consumption reporting problems arise in the context of tariff switches and conditional consumption reporting when the involved timeframe involves a switch from inactive to active quota management.

Initially, in FIG. 10, quota management is inactive, so the ChargingDataReponse-INITIAL message omits a granted quota and correspondingly indicates that quota management is inactive. The ChargingDataReponse-INITIAL message also indicates the time of a forthcoming tariff changes affecting the charging session and it defines both immediate and deferred trigger conditions for triggering consumption reporting. Specifically, the SMF is told to report consumption on an immediate basis responsive to there being a change in the RAT being used to provide the communication session corresponding to this charging session. Immediate reporting in this sense means that the SMF will report the consumption that occurred on the previous RAT immediately, in response to the communication session being transferred to another RAT. The SMF is also told to report consumption responsive to a serving node change on a deferred basis. In other words, the UE 12 involved the communication session may be handed over from one serving node to another serving node in the communication network as a consequence of mobility, and the SFM tracks consumption separately for each serving node, but does not report such consumption immediately.

However, because the ChargingDataResponse-INITIAL message omitted a quota grant, the SMF will not differentiate consumption tracking and reporting for changes in Quality-of-Service (QoS) affecting the communication session and FIG. 10 illustrates the occurrence of a QoS change at some point after the tariff switch. At some later point in time, a RAT change occurs for the communication session and, in accordance with the immediate reporting trigger defined for RAT changes, the SMF reports consumption up to that point by sending a ChargingDataRequest-UPDATE message.

The message indicates service unit consumption prior to the tariff switch (totalVolume=40) and indicates service unit consumption prior to the RAT change (totalVolume=60), but there is no reporting or accounting related to the QoS change. Moreover, although the CHF uses its ChargingDataResponse-UPDATE message to indicate that quota management is now active (temporaryOfflineIndicator=FALSE), the quota grant included in that message cannot be tied to the earlier tariff switch. In other words, because quota management was inactive before the tariff switch, it remains inactive after the tariff switch.

Figure 11:
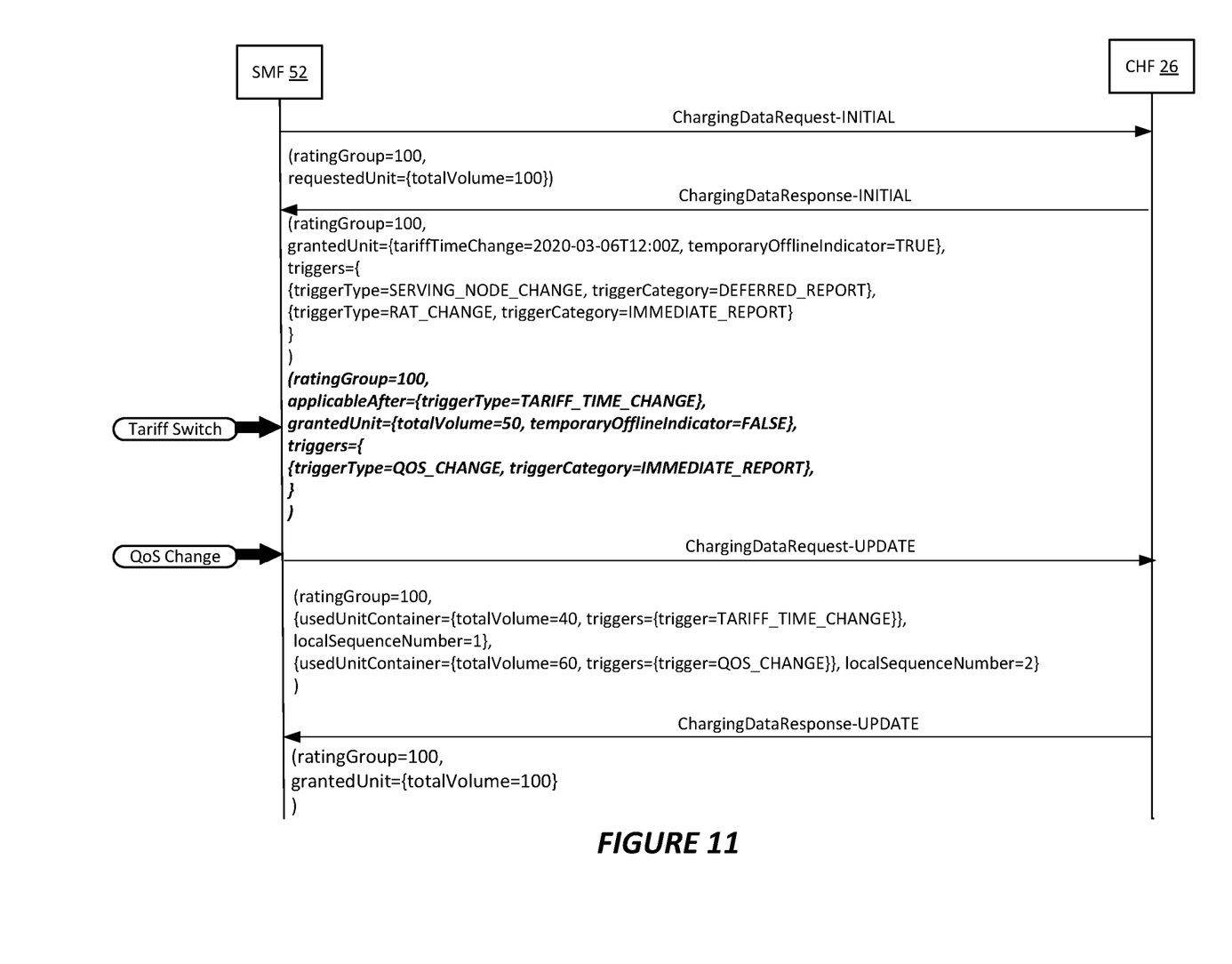
FIG. 11 is a message sequence diagram of example implementation details performed by a network node of an online charging system.

FIG. 11 illustrates one example of advantageous operation by a CHF 26 as implemented by a network node 24, according to one or more of the embodiments contemplated herein, with such operations addressing some or all of the issues highlighted in FIGS. 9 and 10. The signal flow assumes that quota management is currently inactive and subsequently becomes active—i.e., a switch from inactive quota management to active quota management for the charging session in question, and any number of other charging sessions affected by the switch.

FIG. 11 illustrates how providing additional information indicating a granted quota and indicating whether quota management is active or suspended in the ChargingDataResponse-INITIAL message provided by the CHF 26 improves on the current mechanisms by avoiding network flooding in the event of a tariff switch or transition between quota management being active or suspended. The additional information included in the ChargingDataResponse-INITIAL message indicates whether the granted quota applies to the charging session on an immediate basis (i.e., quota management is currently active) or on a deferred basis (i.e., quota management is currently inactive but will become active later).

In the illustrated signaling flow, the CHF 26 receives a ChargingDataRequest-INITIAL message from the SMF 52, to establish a charging session for the corresponding establishment of a communication session in the communication network 10 involving a UE 12, for consumption of a communication service. The request indicates a Rating Group and a requested number of service units (totalVolume=100). The CHF 26 responds with a ChargingDataResponse-INITIAL message that indicates that quota management is inactive and, in stark contrast to conventional approaches, includes a granted quota. Because quota management is currently inactive, the granted quota applies to the charging session on a deferred basis, upon quota management becoming active. FIG. 11 uses bold italicized text to denote granted quota and associated information.

In more detail, FIG. 11 contemplates that a tariff switch will occur subsequent to the initial request message and the CHF 26 advantageously ties resumption of active quota management to the tariff switch. In other words, the operational configuration of the CHF 26 and the resulting signaling allows the CHF 26 to use its initial response to the initial request to (a) indicate that quota management is inactive, (b) indicate that a tariff change will occur at a specific later time, (c) indicate that quota management will become active upon the tariff change, and (d) provide, in advance, a granted quota for use by the SMF 52 in authorizing a corresponding amount of consumption upon quota management becoming active.

To appreciate these details, consider the example contents of the ChargingDataResponse-INITIAL message shown in FIG. 11; it indicates that quota management is currently inactive ("temporaryOfflineIndicator=TRUE", which means that consumption is not limited by quotas), the tariff switch time, various triggers for differentiating and reporting consumption in association with the tariff change. Moreover, the bolded italicized text indicates that the initial message indicates a granted quota ("grantedUnit"), indicates a time or condition at which the granted quota will apply, and indicates one or more trigger types associated with reporting consumption from the granted quota. In the depicted particulars, the CFH 26 indicates that the granted quota will apply at the tariff time change, indicates that the granted quota size is 50 service units, and indicates that the SMF 52 should immediately report the then-current consumption from the granted quota upon a QoS change affecting consumption of the communication service.

FIG. 11 depicts a subsequent ChargingDataResponse-UPDATE message as a consequence of just such a QoS change, along with the involved consumption reporting, and a ChargingDataResponse-UPDATE message from the CHF 26 in reply. One point to note in the update response message is the absence of an indication the quota management mode. That is, FIG. 11 assumes that the SMF 52 and the CHF 26 are "stateful", meaning that they remember the current mode and update their state only upon being reset, a certain condition being met, or upon receiving subsequent signaling indicating a state change. Of course, the present disclosure contemplates stateless operation, in which case the CHF 26 always indicates in its response messages whether quota management is currently active.

As another signaling example, the below text is a JavaScript Object Notation (JSON) ChargingDataResponse message formatted based on YAML Ain't Markup Language (YAML) in 3GPP TS 32.291 with the addition of an applicable. After parameter that indicates the triggers that must be satisfied before the granted service units of a quota granted by the CHF 26 on a deferred basis can be used and/or the triggers enabled—the message contents directly relevant to the deferred quota grant appears in italicized bold text:

```
{
"invocationTimeStamp":"2020-03-061T11:50:02.10Z",
"invocationSequenceNumber":0,
"invocationResult":{"failureHandling":"CONTINUE"},
```

-continued

```
"sessionFailover":"FAILOVER_SUPPORTED",
"multipleUnitInformation":[
  {"ratingGroup":"100",
  "grantedUnit":[
    "tariffTimeChange":"2020-03-06T12:00Z",
    "temporaryOfflineIndicator":true]
  "triggers":[
    {"triggerType":"SERVING_NODE_CHANGE", "triggerCategory":"DEFERRED_REPORT"},
    {"triggerType":"UE_TIMEZONE_CHANGE", "triggerCategory":"DEFERRED_REPORT"},
    {"triggerType":"PLMN_CHANGE","triggerCategory":"IMMEDIATE_REPORT"},
    {"triggerType":"RAT_CHANGE","triggerCategory":"DEFERRED_REPORT"},
    {"triggerType":"TARIFF_TIME_CHANGE","triggerCategory":" DEFERRED_REPORT"},
  {"ratingGroup":"100",
  "applicableAfter":{
    " triggerType"" TARIFF_TIME_CHANGE"},"
  "grantedUnit":[
    "totalVolume":"1000000"]
  "triggers":[
    { "triggerType":"SERVING_NODE_CHANGE","triggerCategory":"DEFERRED_REPORT"},
    {"triggerType":"UE_TIMEZONE_CHANGE",{"triggercCategory":"IMMEDIATE_REPORT",
    {"triggerType":"PLMN_CHANGE",{"triggercCategory":"IMMEDIATE_REPORT"},
    {"triggerType":"RAT_CHANGE",{"triggercCategory":"IMMEDIATE_REPORT"},
    {"triggerType":"QUOTA_EXHAUSTED",{"triggercCategory":"IMMEDIATE_REPORT"}],
"pDUSessionChargingInformation":
...
```

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method of operation by a network node of a charging system associated with a communication network, the method comprising:
   receiving a request in relation to a charging session for a user device, for authorizing consumption by the user device of a communication service provided via the communication network;
   granting a quota of units authorizing a corresponding amount of consumption of the communication service by the user device, the granted quota granted in dependence on a credit reservation; and
   sending a response to the request that indicates the granted quota and indicates whether quota management is active, where the granted quota applies to the charging session on an immediate basis if quota management is active and otherwise applies on a deferred basis, upon quota management subsequently becoming active.

2. The method of claim 1, wherein, in the case that the granted quota applies on the deferred basis, further indicating in the response a trigger for quota management subsequently becoming active, for application of the granted quota to the charging session coincident with quota management subsequently becoming active.

3. The method of claim 2, wherein indicating the trigger for quota management subsequently becoming active comprises indicating that quota management will become active coincident with a tariff change applicable to charging for use of the communication service.

4. The method of claim 3, wherein the response further indicates a time of the tariff change.

5. The method of claim 3, wherein the response further includes trigger information indicating one or more charging-report triggers applicable to consumption of the communication service in the charging session before the tariff change and one or more charging-report triggers applicable to consumption of the communication service in the charging session after the tariff change.

6. The method of claim 2, wherein indicating the trigger for quota management subsequently becoming active comprises indicating a time at which quota management will become active.

7. The method of claim 1, wherein, if quota management is inactive, the method further includes including trigger information in the response that indicates one or more charging-report triggers applicable to consumption of the communication service in the charging session while quota management is suspended and one or more charging-report triggers applicable to consumption of the communication service in the charging session after quota management becomes active.

8. The method of claim 1, wherein receiving the request comprises receiving an initial charging request for establishing the charging session, and wherein sending the response comprises sending an initial charging response to establish the charging session.

9. The method of claim 1, wherein receiving the request comprises receiving an intermediate charging request subsequent to establishment of the communication session, and wherein sending the response comprises sending an intermediate charging response to continue the charging session.

10. The method of claim 1, wherein granting the quota of units authorizing the corresponding amount of consumption of the communication service by the user device, as the granted quota, comprises initiating the credit reservation against available credit in a subscriber account associated with the user device, wherein the value of the credit reservation depends on a rating function applied for the units in the granted quota.

11. The method of claim 1, wherein the response to the request indicates the granted quota but indicates that quota management is inactive such that the granted quota applies to the charging session on the deferred basis, upon quota management subsequently becoming active, wherein:

while quota management is inactive, consumption of the communication service in the charging session is not subject to the granted quota; and upon quota management becoming active, consumption of the communication service in the charging session becomes subject to the granted quota.

12. A network node configured for operation in a charging system associated with a communication network, the network node comprising:

communication interface circuitry configured for communicatively coupling the network node to one or more other nodes in the charging system or the communication network; and processing circuitry operatively associated with the communication interface circuitry and configured to:

receive a request in relation to a charging session for a user device, for authorizing consumption by the user device of a communication service provided via the communication network;

grant a quota of units authorizing a corresponding amount of consumption of the communication service by the user device, the granted quota granted in dependence on a credit reservation; and send a response to the request that indicates the granted quota and indicates whether quota management is active, where the granted quota applies to the charging session on an immediate basis if quota management is active and otherwise applies on a deferred basis, upon quota management subsequently becoming active.

13. The network node of claim 12, wherein the processing circuitry is configured to, in the case that the granted quota applies on the deferred basis, further indicate in the response a trigger for quota management subsequently becoming active, for application of the granted quota to the charging session coincident with quota management subsequently becoming active.

14. The network node of claim 13, wherein the processing circuitry is configured to indicate in the response that quota management will become active coincident with a tariff change applicable to charging for use of the communication service.

15. The network node of claim 14, wherein the processing circuitry is further configured to indicate in the response a time of the tariff change.

16. The network node of claim 14, wherein the processing circuitry is configured to further include in the response trigger information indicating one or more charging-report triggers applicable to consumption of the communication service in the charging session before the tariff change and one or more charging-report triggers applicable to consumption of the communication service in the charging session after the tariff change.

17. The network node of claim 13, wherein the processing circuitry is configured to indicate in the response, as the trigger for quota management subsequently becoming active, a time at which quota management will become active.

18. The network node of claim 12, wherein the processing circuitry is configured to, if quota management is inactive, further include trigger information in the response that indicates one or more charging-report triggers applicable to consumption of the communication service in the charging session while quota management is suspended and one or more charging-report triggers applicable to consumption of the communication service in the charging session after quota management becomes active.

19. The network node of claim 12, wherein the request comprises an initial charging request for establishing the charging session, and the response comprises an initial charging response to establish the charging session.

20. The network node of claim 12, wherein the request comprises an intermediate charging request subsequent to establishment of the communication session, and the response comprises an intermediate charging response to continue the charging session.

21. The network node of claim 12, wherein, to grant the quota of units authorizing the corresponding amount of consumption of the communication service by the user device as the granted quota, the processing circuitry is configured to initiate the credit reservation against available credit in a subscriber account associated with the user device, wherein the value of the credit reservation depends on a rating function applied for the units in the granted quota.

22. The network node of claim 12, wherein the response to the request indicates the granted quota but indicates that quota management is inactive such that the granted quota applies to the charging session on the deferred basis, upon quota management subsequently becoming active, wherein:

while quota management is inactive, consumption of the communication service in the charging session is not subject to the granted quota; and upon quota management becoming active, consumption of the communication service in the charging session becomes subject to the granted quota.

* * * * *